US009805040B2

(12) United States Patent
Lindley et al.

(10) Patent No.: US 9,805,040 B2
(45) Date of Patent: Oct. 31, 2017

(54) EMAIL AND IDENTITY MIGRATION BASED ON RELATIONSHIP INFORMATION

(71) Applicant: Dell Products L.P., Round Rock, TX (US)

(72) Inventors: Chad Milton Lindley, Mt. Horeb, WI (US); Tom Willis, Madison, WI (US); Grigory Valerievich Vasiliev, St. Petersburg (RU); Carl Jeffrey Rumachik, Madison, WI (US)

(73) Assignee: QUEST SOFTWARE INC., Aliso Viejo, CA (US)

( * ) Notice: Subject to any disclaimer, the term of this patent is extended or adjusted under 35 U.S.C. 154(b) by 330 days.

(21) Appl. No.: 14/588,181

(22) Filed: Dec. 31, 2014

(65) Prior Publication Data

US 2016/0188614 A1 Jun. 30, 2016

(51) Int. Cl.
*G06F 17/30* (2006.01)
*H04L 12/58* (2006.01)

(52) U.S. Cl.
CPC .. *G06F 17/30079* (2013.01); *G06F 17/30598* (2013.01); *G06F 17/30876* (2013.01); *H04L 51/22* (2013.01)

(58) Field of Classification Search
USPC .................................. 707/609; 709/226, 203
See application file for complete search history.

(56) References Cited

U.S. PATENT DOCUMENTS

| | | | | |
|---|---|---|---|---|
| 7,483,969 B2 * | 1/2009 | Chavda | ................ | G06Q 10/107 709/203 |
| 9,009,315 B2 * | 4/2015 | Maloy | ..................... | H04L 61/15 709/226 |
| 2003/0217101 A1 * | 11/2003 | Sinn | ..................... | H04L 61/1523 709/203 |
| 2008/0201705 A1 * | 8/2008 | Wookey | .................... | G06F 8/68 717/175 |
| 2009/0089862 A1 * | 4/2009 | Sun | ....................... | G06F 3/0622 726/4 |

OTHER PUBLICATIONS

Dell, "Migrator for Notes to Exchange" retrieved Oct. 22, 2015 from http://software.dell.com/documents/notes-migrator-for-exchange-datasheet-19865.pdf, 2 pgs.
Wikipedia, "NodeXL" retrieved Oct. 22, 2015 from https://en.wikipedia.org/wiki/NodeXL, 5 pgs.

* cited by examiner

*Primary Examiner* — Hung T Vy
(74) *Attorney, Agent, or Firm* — Maschoff Brennan

(57) ABSTRACT

Methods, systems, and apparatuses for creating collections of associated accounts for a migration process. An example system includes a processing device and memory that stores accounts in accordance with a first email, identity or file domain. The processing device may create a collection of related accounts stored in accordance with a first email, identity or file domain based on active directory information of the stored accounts and may migrate information included in the collection of accounts into a second email, identity or file domain. The collection includes one or more first-level accounts that are identified as having a relationship with a predefined root account based on a delegation attribute.

20 Claims, 7 Drawing Sheets

EMAIL AND IDENTITY MIGRATION BASED ON RELATIONSHIP INFORMATION

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Current email, identity and file migration solutions fail to provide a fully robust migration of users to new email, identity and file platforms. These solutions have a difficult time identifying individuals whose data and/or identity should be migrated together. The most common way to solve this problem is by tabulating a master object (for example, mailbox or identity object) list through manual lists and spreadsheets, but it is very difficult to manually manage a spreadsheet that may have many thousands of rows. Plus it is very difficult to collate an accurate and appropriate list of objects for each migration, when the necessary relationship information between mailboxes (or other types of migrating objects) is not included in the spreadsheet or even readily available. Thus, it is difficult to determine which objects should migrate together to minimize the impact on the organization.

SUMMARY

In one example, a system includes a processing device and memory that stores accounts in accordance with a first email domain. The processing device may create a collection of related accounts stored in accordance with a first email or identity domain based on email platform and/or source directory information of the stored accounts and may migrate information for the objects in these automatically generated collections into a second email or identity domain.

The processing device creates the collection by identifying one or more first-level objects that are identified as having a relationship with a predefined root account based on access controls, delegation attributes, or other relationship criteria and saving the identified objects as the collection of related objects, provided that a threshold number of objects and/or levels has not been reached.

In the delegation example, the attribute may include a right to perform at least one of read, edit, delete, or send-on-behalf on at least one of mail content, contacts content, task content, file content, or calendar content for another account. Alternatively, the relationship attribute leveraged may include information derived from an organizational chart, group membership information, access control list information, information identifying one account being at least one of a sender to or a recipient from another account based on a threshold number of communications, and/or mentor information.

BRIEF DESCRIPTION OF THE DRAWINGS

A more complete understanding of the present disclosure may be obtained by reference to the following Detailed Description, when taken in conjunction with the accompanying Drawings.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
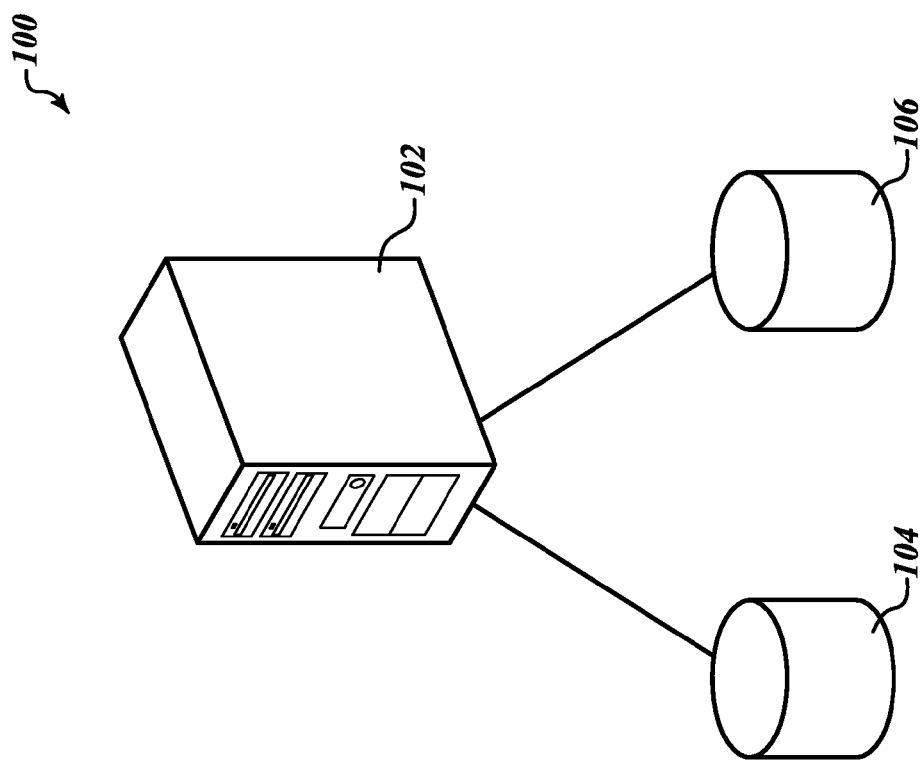
FIG. 1 shows an environment for providing effective migration between email systems.

FIG. 1 illustrates an example of a system 100 for performing migration of user accounts from a first email, identity or file platform (e.g., an email application) to a second corresponding email, identity or file platform. System 100 may include information handling system 102 that is in data communication with first data storage device 104 and second data storage device 106. First data storage device 104 may include user accounts associated with the first email, identity or file platform. Second data storage device 106 may include user accounts after information handling system 102 migrates the user accounts associated with the first email, identity or file platform into user accounts for use with the second email, identity or file platform.

System 100 may include, in some embodiments, a single storage device for storing email, identity or file user accounts for both the first and second email, identity or file platforms. In some embodiments, more than two storage devices may be used. System 100 may store email, identity or file user accounts for both the first and second email, identity or file platforms in a distributed manner across one or more networks.

Information handling system 102 may automatically build collections of recommended objects, based on information stored within the source email, identity or file system (e.g., access controls or directory information). This information may include relationship information. The relationship information may include delegation information, proxy access information, group membership information, organizational chart relationship information, frequent sender to recipient information, mentor information, etc. Because information handling system 102 produces smarter collections of objects for migration, the effort required to manage the migration process and, more importantly, interruptions to the daily operations of the organization may be greatly reduced.

In some embodiments, delegation information or an access control list (ACL) includes information related to the granting to others of the right to read, edit, delete, or send on one's behalf some or all content in a user's mailbox. The content in the user's mailbox may include mail, contacts, tasks, and/or calendar events. The following are example email systems that may include delegation information and other relationship information that system 100 uses for migration collection building: Google® Apps, Outlook®/Exchange®, Notes®/Domino®, GroupWise®, Zimbra®. A delegator-delegate (delegation) relationship may indicate important business relationships and a certain closeness of workers in a company, thus producing more cohesive migration collections. Relationship information are a likely indicator of important business proximity. Group membership information identifies a group of individuals where their email addressed are grouped together to form a single source for sending emails. The individuals are grouped because they share a common interest or business goal. Frequent sender/recipient information identifies those within the business that communicate frequently with each other, thus indicating an important business proximity. Mentor information includes information as to what employees play a mentorship role to other employees. Because system 100 forms collections using those important business relationships, then more effective and efficient migrations are possible. The information handling system 102 may follow a chain of delegations in order to yield a relevant collection of dozens or hundreds of users who ought to be migrated together. Once information handling system 102 has created a collection, information handling system 102 may perform the migration of the collection to the new email platform.

Figure 2:
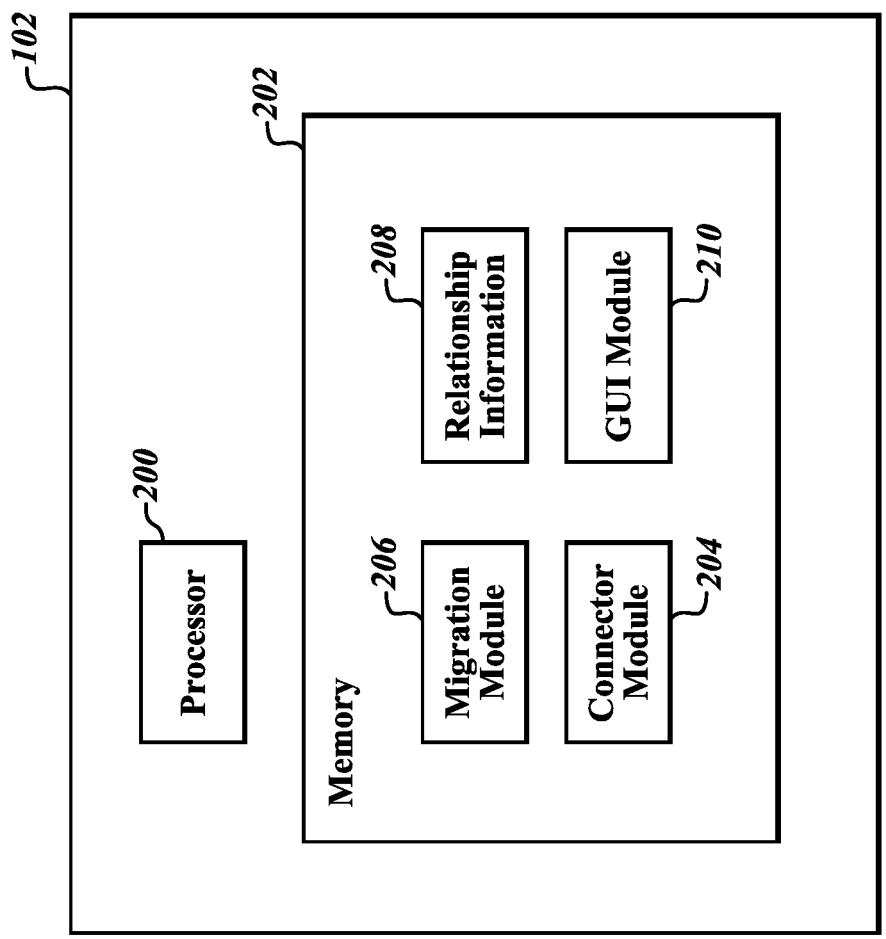
FIG. 2 shows an example of an information handling system for performing migration between email, identity or file systems.

As shown in FIG. 2, information handling system 102 may include processor(s) 200 and memory 202. Memory 202 may include connector module 204, migration module 206, relationship information 208, and graphical user interface module 210. Connector module 204, when executed by processor(s) 200, identifies relationship connections between objects according to predefined relationship information stored in the memory 202. Connector module 204 forms one or more collections, based on the identified relationship connections and based on predefined collection size limitations.

Migration module 206, when executed by processor(s) 200, performs migration of the collection(s) of objects from the first email platform to the second email platform.

GUI module 210, when executed by processor(s) 200

Processor(s) 200 may include a microprocessor, controller, a programmable logic device such as a field-programmable gate array (FPGA), an application-specific integrated circuit (ASIC), or other hardware resource operable to provide the ability to search through AD information of users' email accounts to assess what accounts to include in a migration collection.

Memory 202 may be any form of volatile or nonvolatile memory including magnetic media, optical media, RAM including dynamic RAM (DRAM) and static RAM (SRAM), ROM, erasable/programmable memory, solid-state memory, such as flash memory, removable media, or any other suitable local or remote memory component or components. Memory 202 may store any suitable data or information utilized by the processor(s) 200, including one or more software modules embedded in a computer-readable medium, and/or encoded logic incorporated in hardware. In particular embodiments, memory 202 may include main memory for storing instructions for processor(s) 200 to execute or data for processor(s) 200 to operate on. In particular embodiments, one or more memory-management units (MMUs) may reside between processor(s) 200 and memory 202 and facilitate access to memory 202 requested by processor(s) 200. As used herein, memory does not include purely transitory media, such as signals and communication media. As such, memory is a form of nontransitory computer-readable media. As used herein, nontransitory computer-readable media include one or more of optical storage, magnetic storage, RAM, ROM, solid-state memory such as flash memory, a hard disk drive, a floppy drive, tape storage, a smart card, an integrated circuit, and so forth.

Software modules include one or more of applications, bytecode, computer programs, executable files, computer-executable instructions, program modules, code expressed as source code in a high-level programming language such as C, C#, C++, Perl, Java, or other, a low-level programming code such as machine code, etc. An example of a software module is a BIOS file. A software module may include an application programming interface (API), a dynamic-link library (DLL) file, an .exe file, firmware, and so forth.

Processor(s) 200 may include more than one processor, such as may be distributed across private and/or public data network(s). Also, any of the modules 204, 206, or 210 may include components stored at memory distributed across the private and/or public data network(s). The different email platforms may be stored on the same storage device or may be stored on multiple data storage devices across the private and/or public data network(s).

Processes described herein may be illustrated as a collection of blocks in a logical flow graph, which represent a sequence of operations that may be implemented in hardware, software, or a combination thereof. In the context of software, the blocks represent computer-executable instructions that are executable by one or more processors to perform the recited operations. The order in which the operations are described or depicted in the flow graph is not intended to be construed as a limitation. Also, one or more of the described blocks may be omitted without departing from the scope of the present disclosure.

Figure 3:
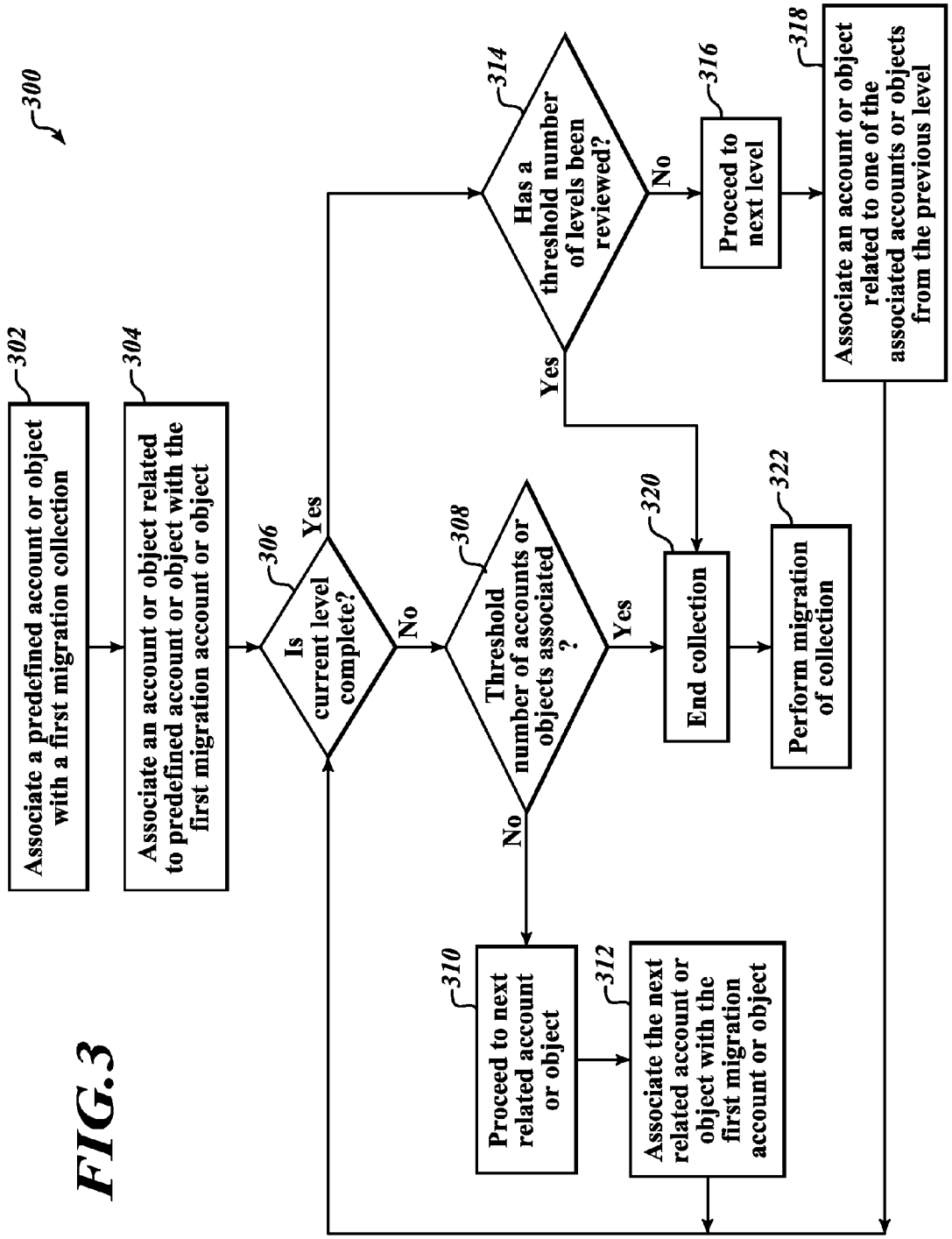
FIG. 3 shows an illustrative process for effectively migrating an email, identity or file system to a new corresponding system.

FIG. 3 shows an illustrative process 300 for effectively migrating an email system to a new email system. Illustrative process 300 may be performed by information handling system 102 shown in FIG. 1. Steps 302 through 320 work to partition the relationship information tree into a collection to be migrated in Step 322. There are other methods to partition the relationship information tree not illustrated here that are also claimed. Prior to processing the relationship information, any cycles, or circular relationships, may be removed from the relationship information to create a cycle-free relationship tree, as mentioned in below. First, at block 302, migration tool module 206 causes processor(s) 200 to start at a seed user account associated with an email, identity or file platform that is to be migrated to a new email, identity or file platform. This seed user account or identifier for this seed user account is then saved in a first migration collection. The maximum size of collection may be controlled by the number of objects in the collection (threshold number of accounts), or optionally, as shown in the illustration, by the maximum number of levels in the relationship tree. Other process for migrating one system to another system may leverage relationship information by analyzing the entire platform, thus negating the need of having to start at a seed user account or identifier.

At block 304, processor(s) 200 analyzes relationship information of the seed user account in order to identify other user accounts associated in a predefined way with the seed user account based on one or more relationship attribute. These identified other user accounts or their associated identifiers are considered at a first level, relative to the seed user account, and are associated with the first migration collection. The relationship information may include delegation information, proxy access information, group membership information, organizational chart relationship information, ACLs, frequent sender information, frequent recipient information, mentor information, etc.

At decision block 306, processor(s) 200 determines whether all the user accounts in the current level have been analyzed for their relationship information. The concept of levels is more relevant in some implementations than others. For example, the concept of levels may be more important when leveraging an organization chart to gather the relationship information. ACLs relationships may not have clearly distinguishable "levels" and may instead limit collections based on total number of objects desired within each collection. In such an implementation, the blocks referring to levels may be removed. This produces collections that are limited strictly by a size threshold, thus having no need for this step.

At decision block 308, processor(s) 200 determines whether the number of objects associated with the first migration collection meets or exceeds a threshold number. This threshold number of accounts may be a default number or may be one that is controlled by a migration administrator. An example of a graphical user interface for allowing the migration administrator to control this threshold value is described in more detail below.

If, at decision block 306, there are still objects that are left to be analyzed, and at decision block 308 the threshold number of identified accounts associated with the first migration collection does not meet or exceed a threshold number, then, at block 310, processor(s) 200 proceeds to the next object identified by relationship information under consideration for the current collection. At block 312, the next object is associated with the first migration collection. Then process 300 returns to decision block 306.

If, at decision block 306, the current collection is determined to be complete (e.g., if no unanalyzed objects remain for consideration), then, at decision block 314, processor(s) 200 determines whether a number of levels associated with the first migration collection meets or exceeds the threshold number of levels (if specified). This threshold number of levels may be a default number or may be one that is controlled by the migration administrator through a user interface as shown by example below.

If, at decision block 314, the threshold number of levels has not been reached, then, at block 316, processor(s) 200 proceeds to the first associated object at the next level. At block 318, a user account that has been delegated or has a relationship with an already saved account from the previous level is saved or associated with the first migration collection. Then, the process 300 returns to the decision block 306 to repeat.

If, at decision block 308, processor(s) 200 determines that the threshold number of accounts (if specified) has been saved or associated with the first migration collection or at decision block 314 the threshold number of levels (if specified) has been associated with the first migration collection, then, at block 320, the first migration collection is considered complete and ready for migration. At block 322, the migration of the first migration collection may be performed or, alternatively, the operator may be given an opportunity to review and/or update the collection prior to migration. Completion of the first migration collection may initiate repetition of process 300 in order to create a second migration collection.

Figure 4:
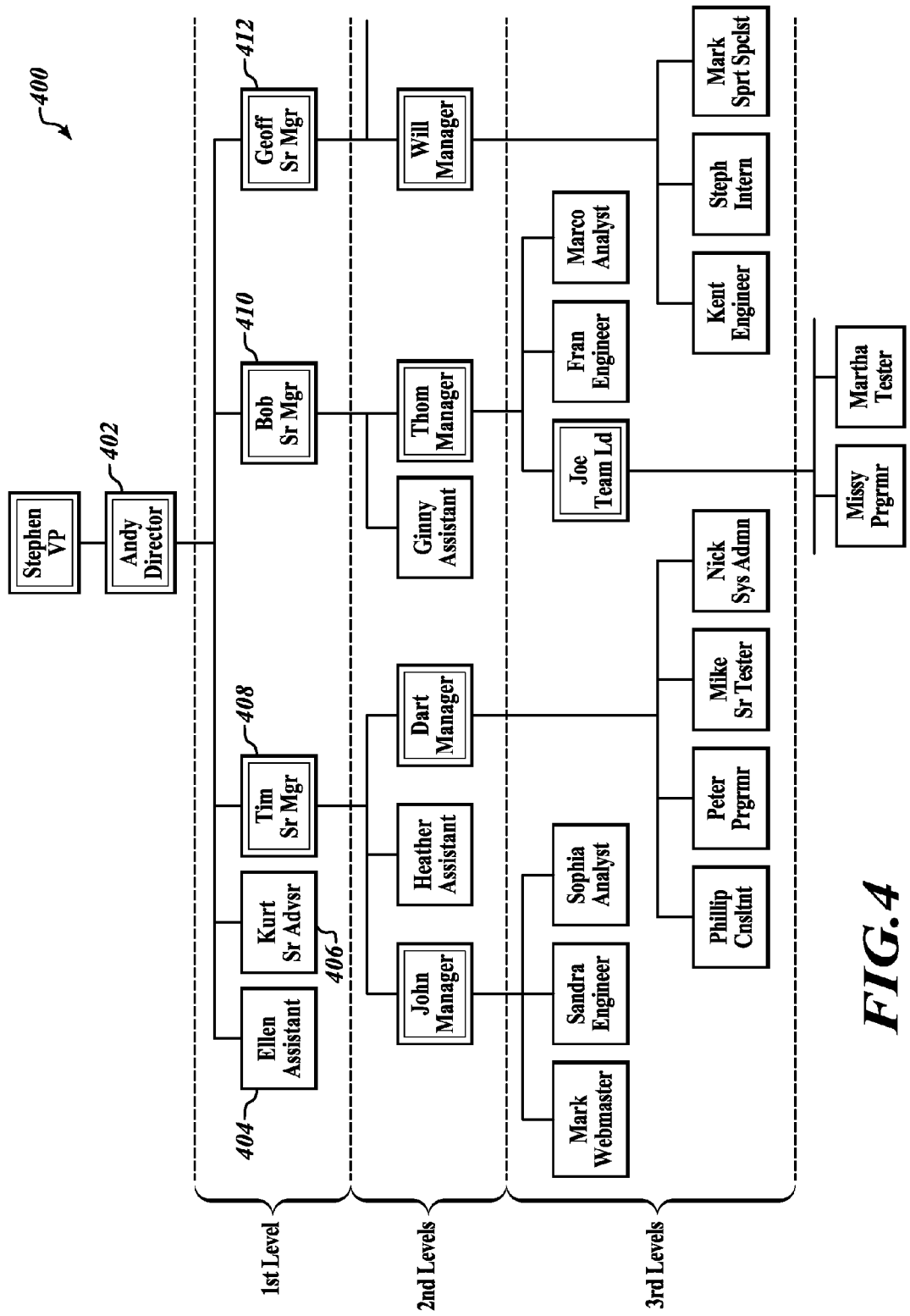
FIG. 4 shows an example of a delegation tree used for performing migration.

FIG. 4 illustrates an example of relationship tree 400 that processor(s) 200 may progress through when performing migration collection generation. If a seed user account is designated as Andy Director 402, then a first level of user accounts would be those in which Andy Director 402 has some sort of relationship. In one example, the first level includes the following other user accounts: Ellen Assistant 404; Kurt Sr. Advisor 406; Tim Sr. Manager 408, Bob Sr. Manager 410; and Geoff Sr. Manager 412. Ellen Assistant 404 may be associated with Andy Director 402, due to email delivery delegation information (i.e., send-on-behalf rights), included within the email account (e.g., active directory) of Andy Director 402. Kurt Sr. Advisor 406 may be associated with Andy Director 402 based on mentor relationship information included within the email account of Andy Director 402. Bob Sr. Manager 410 may be associated with Andy Director 402 based on organizational chart information. Tim Sr. Manager 408 and Geoff Sr. Manager 412 may be associated with Andy Director 402, based on calendar designation information included within the email account of Andy Director 402. Tree 400 shows second-level relationships that show email accounts that relate to Tim Sr. Manager 408, Bob Sr. Manager 410, and Geoff Sr. Manager 412. The tree 400 also shows third-level relationships that show email accounts that relate to email accounts that relate to Tim Sr. Manager 408, Bob Sr. Manager 410, and Geoff Sr. Manager 412. Other examples are possible without departing from the scope of embodiments.

As the processor identifies the objects or user accounts having relationships with other objects or user accounts that all cascade from the root account (Andy Director 402), the identified accounts may be included in a migration collection. The identification of accounts and their inclusion into a migration collection continues until a number of accounts included meets or exceeds a threshold number of accounts or until a number of levels of the migration collection that have been traversed during the identification meets or exceeds a threshold number of levels.

Figure 5:
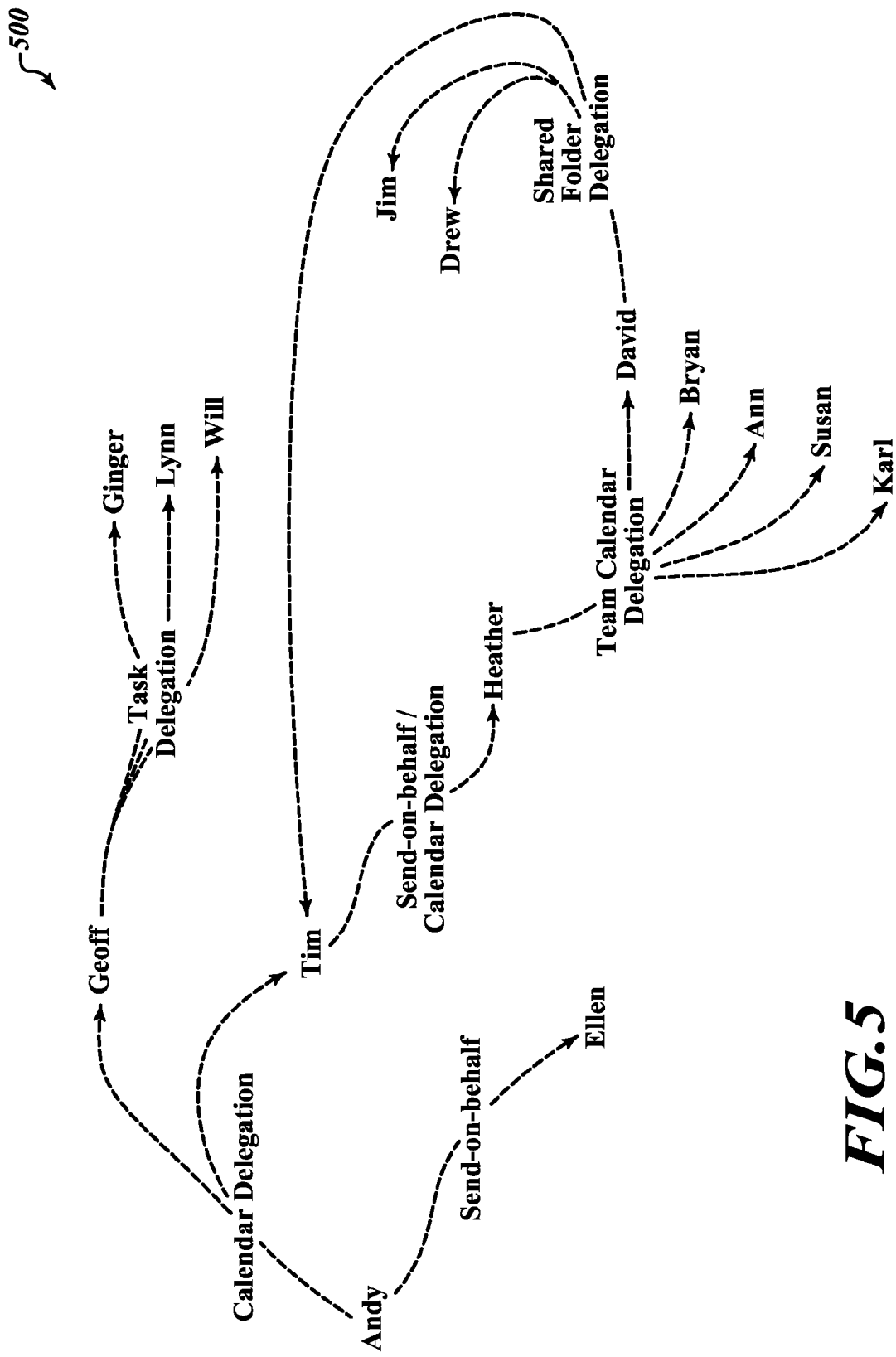
FIG. 5 shows details of the delegation tree of FIG. 4.

FIG. 5 illustrates in more detail some of the branches of relationship tree 400 of FIG. 4. For example, the email account of Tim (Tim Sr. Manager 408) identifies Heather's email account as having send-on-behalf rights and calendar designation relationship information. The email account to David is one level below Heather's email account, due to a team calendar designation included within Heather's email account. In this example David's email account includes shared folder delegation information that includes Tim's email account as one of the delegates. The circular relationship from Tim to Heather to David back to Tim is called a cycle. When cycles exist in the relationship graph, these cycles need to be removed from the relationship graph in order to create a cycle-free relationship tree that can be processed by process 300.

Figure 6:
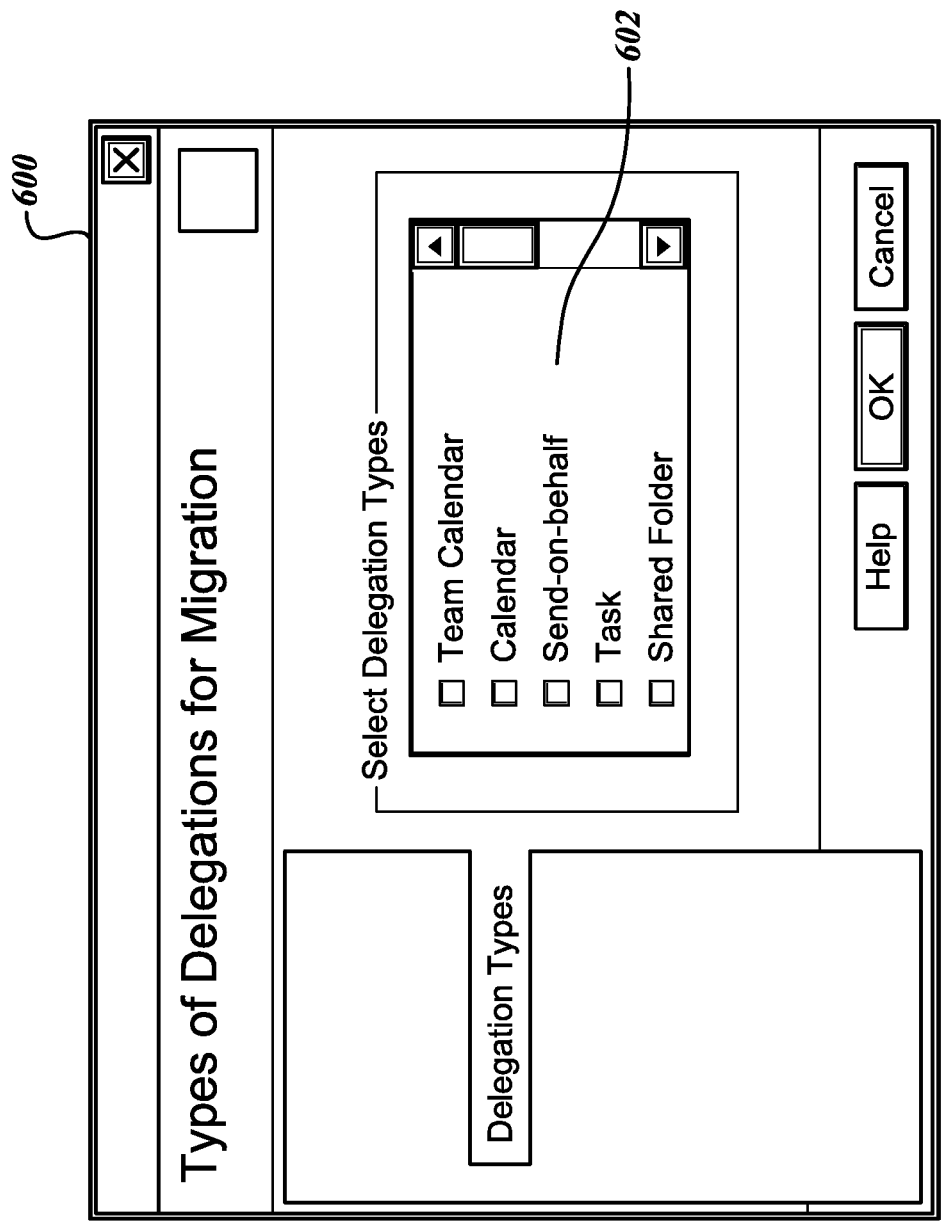
FIG. 6 illustrates an example of a graphical user interface for allowing an administrator to select types of delegations to include in a migration collection.

FIG. 6 illustrates an example of a graphical user interface (GUI) 600 that is interactive to allow an administrator to identify the types of delegations for creating a migration collection. GUI 600 may be a page such as a Webpage that may include one or more interactive windows. At delegation-types window 602, the administrator may select various types of relationship information that processor(s) 200 may analyze in each email account while progressing through relationships to determine whether or not to add user accounts to a current migration collection. In this example, the administrator may select any of the following types of delegations: a team calendar designation; a calendar designation, send-on-behalf information; task information; and shared folder information.

Figure 7:
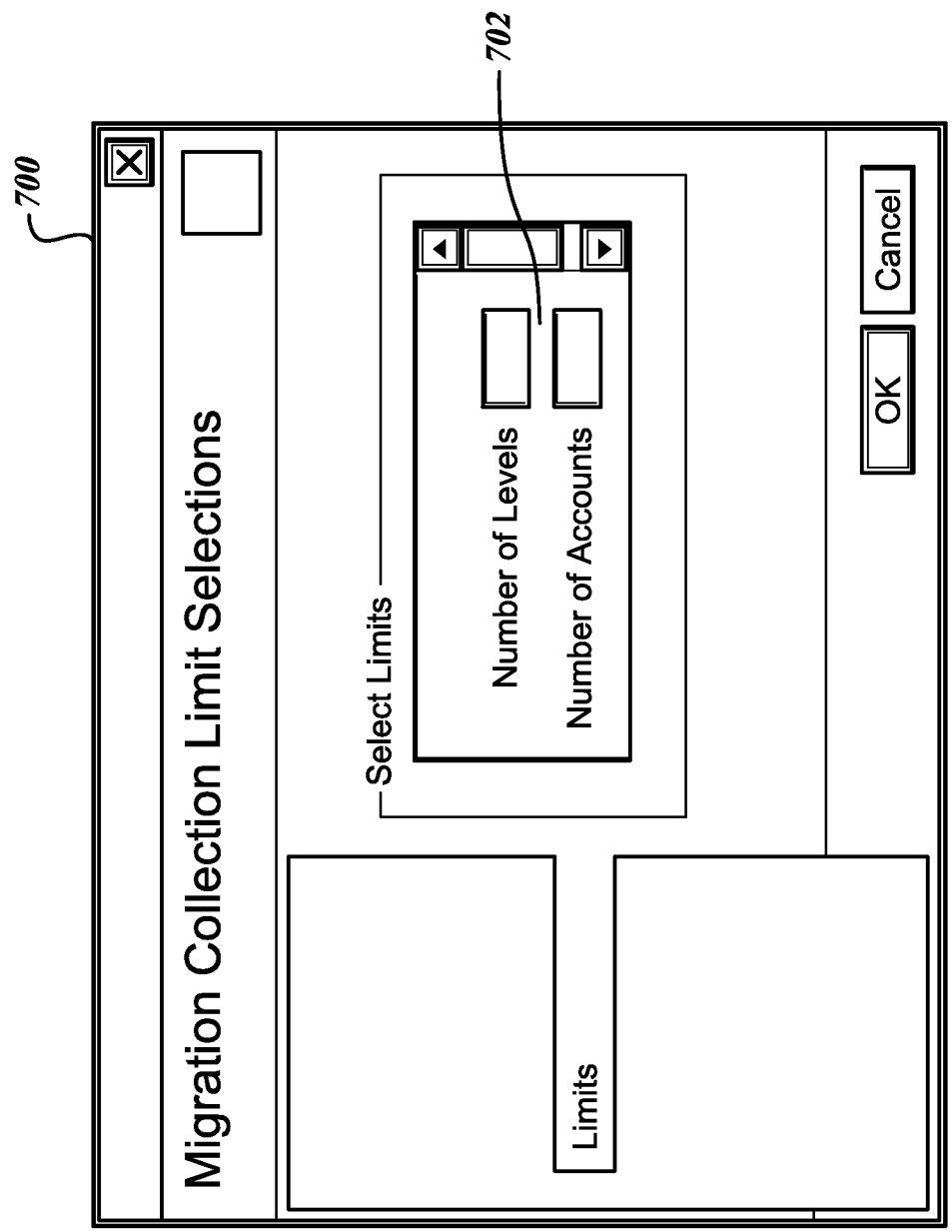
FIG. 7 illustrates an example of a graphical user interface for allowing an administrator to define the limits regarding generation of a migration collection.

FIG. 7 illustrates an example of graphical user interface 700 that allows a migration administrator to set limits that processor(s) 200 applies when generating a migration collection. Graphical user interface 700 may be a page that includes limit-designation window 702. Limit-designation window 702 may allow the administrator to indicate the number of levels and/or the number of user accounts that the processor will use to limit the size of the migration collection (see decision blocks 308 and 314 of FIG. 3). Limit-designation window 702 may include a number of levels field where the administrator may enter a limit number for the amount of levels that are analyzed during collection creation. Limit-designation window 702 may include a number-of-accounts field where the administrator may enter a limit number for the amount of accounts that are analyzed during collection creation.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications, and substitutions without departing from the scope of the present disclosure.

What is claimed is:

1. A method comprising:
   determining, by an information handling system, relationship information among accounts or objects stored in accordance with at least one of a first email domain, a first identity domain or a first file domain, based on one or more relationship attributes comprising at least one of:
     an authorization for a first account to perform at least one of a read, an edit, a delete, or a send-on-behalf of for at least one of content, contacts content, task content, or calendar content for a second account;
     organizational chart information;
     group membership information;
     access control list information;
     information identifying one account as being at least one of a sender to or a recipient from another account based on a threshold number of communications; and
     mentor information;
     wherein the one or more relationship attributes are included in active directory information associated with the first email domain, the first identity domain or the first file domain;
   creating, by the information handling system and based on the relationship information, collections of related accounts or collections of related objects;
   determining, by the information handling system, one or more circular relationships among the collections of related accounts or the collection of related objects;
   resolving, by the information handling system, the one or more circular relationships; and
   migrating, by the information handling system, the collection of related accounts or related objects into at least one of a second email domain, a second identity domain or a second file domain.

2. The method of claim 1, further comprising:
   identifying one or more first-level accounts or objects that are identified as having a relationship with a predefined root account or object based on a delegation attribute;
   associating the one or more first-level accounts or objects with the collection of related accounts or objects; and
   associating, based on the relationship information, accounts or objects in subsequent levels with the collection of related accounts or objects, until a threshold number of levels or a maximum size of the collection of related accounts or objects has been reached.

3. The method of claim 1, further comprising:
   identifying one or more first-level objects that are identified as having a relationship with a predefined root account based on at least one of an access control, a delegation attribute, or another type of relationship criteria.

4. The method of claim 1, wherein the creating comprises identifying, based on one or more relationship attributes, accounts or objects that are identified as having a relationship with another account or object already associated with the collection of related accounts or objects, wherein the one or more relationship attributes comprise a right to perform at least one of read, edit, delete, or send-on-behalf on at least one of content, contacts content, task content, or calendar content for another account.

5. The method of claim 1, wherein the creating comprises identifying, based on one or more relationship attributes, accounts or objects that are identified as having a relationship with another account or object already associated with the collection of related accounts or objects, wherein the one or more relationship attributes comprise relationship information identified in an organizational chart.

6. The method of claim 1, wherein the creating comprises identifying, based on one or more relationship attributes, accounts or objects that are identified as having a relationship with another account or object already associated with the collection of related accounts or objects, wherein the one or more relationship attributes comprise group membership information.

7. The method of claim 1, wherein the creating comprises identifying, based on one or more relationship attributes, accounts or objects that are identified as having a relationship with another account or object already associated with the collection of related accounts or objects, wherein the one or more relationship attributes comprise access control list information.

8. The method of claim 1, wherein the creating comprises identifying, based on one or more relationship attributes, accounts or objects that are identified as having a relationship with another account or object already associated with the collection of related accounts or objects, wherein the one or more relationship attributes comprise information identifying one account or object as being at least one of a sender to or a recipient from another account or object based on a threshold number of communications.

9. The method of claim 1, wherein the creating comprises identifying, based on one or more relationship attributes, accounts or objects that are identified as having a relationship with another account or object already associated with the collection of related accounts or objects, wherein the one or more relationship attributes comprise mentor information.

10. An information handling system comprising:
a processing device; and
memory configured to store one or more modules that include instructions executable by the processing device to:
determine relationship information among accounts or objects stored in accordance with at least one of a first email domain, a first identity domain or a first file domain, based on one or more relationship attributes comprising at least one of:
an authorization for a first account to perform at least one of a read, an edit, a delete, or a send-on-behalf of for at least one of content, contacts content, task content, or calendar content for a second account;
organizational chart information;
group membership information;
access control list information;
information identifying one account as being at least one of a sender to or a recipient from another account based on a threshold number of communications; and
mentor information,
wherein the one or more relationship attributes are included in active directory information associated with the first email domain, the first identity domain or the first file domain;
create, based on the relationship information, collections of related accounts or collections of related objects;
determine one or more circular relationships among the collections of related accounts or the collection of related objects;
resolve the one or more circular relationships; and
migrate the collection of related accounts or related objects into at least one of a second email domain, a second identity domain or a second file domain.

11. The information handling system of claim 10, wherein the one or more modules are further executable by the processing device to create by:
identifying, based on the relationship information, one or more first-level accounts or objects that are identified as having a relationship with a predefined root account or object based on a delegation attribute;
associating the one or more first-level accounts or objects with a collection of accounts or a collection of objects, until a threshold number of account levels has been reached; and
associating, based on the relationship information, accounts or objects in subsequent levels with the collection of accounts or objects, until a threshold number of levels or a maximum size of the collection of related accounts or objects has been reached.

12. The information handling system of claim 10, further comprising:
identifying one or more first-level objects that are identified as having a relationship with a predefined root account based on at least one of an access control, a delegation attribute, or another type of relationship criteria.

13. The information handling system of claim 10, wherein the one or more modules are further executable by the processing device to create by:
identifying, based on the relationship information, accounts or objects that are identified as having a relationship with another account or object already associated with the collection of related accounts or objects, wherein the relationship information comprises a right to perform at least one of read, edit, delete, or send-on-behalf on at least one of content, contacts content, task content, or calendar content for another account.

14. The information handling system of claim 10, wherein the one or more modules are further executable by the processing device to create by:
identifying, based on the relationship information, accounts or objects that are identified as having a relationship with another account or object already associated with the collection of related accounts or objects, wherein the relationship information comprises an organizational chart information.

15. The information handling system of claim 10, wherein the one or more modules are further executable by the processing device to create by:
identifying, based on the relationship information, accounts or objects that are identified as having a relationship with another account or object already associated with the collection of related accounts or objects, wherein the relationship information comprises group membership information.

16. The information handling system of claim 10, wherein the one or more modules are further executable by the processing device to create by:
identifying, based on the relationship information, accounts or objects that are identified as having a relationship with another account or object already associated with the collection of related accounts or objects, wherein the relationship information comprises access control list information.

17. The information handling system of claim 10, wherein the one or more modules are further executable by the processing device to create by:
identifying, based on the relationship information, accounts or objects that are identified as having a relationship with another account or object already associated with the collection of related accounts or objects, wherein the relationship information comprises information identifying one account or object being at least one of a sender to or a recipient from another account or object based on a threshold number of communications.

18. The information handling system of claim 10, wherein the one or more modules are further executable by the processing device to create by:

identifying, based on the relationship information, accounts or objects that are identified as having a relationship with another account or object already associated with the collection of related accounts or objects, wherein the relationship information comprises mentor information.

19. A method comprising:

at a memory device, storing a plurality of user accounts in accordance with at least one of a first email domain, a first identity domain or a first file domain; and at an information handling system, identifying one or more accounts or objects of the plurality of user accounts that are identified as having a relationship with another account or object based on one or more relationship attributes, wherein the one or more relationship attributes comprise at least one of:

a right to perform at least one of read, edit, delete, or send-on-behalf on at least one of content, contacts content, task content, or calendar content for another account;

organizational chart information;

group membership information;

access control list information;

information identifying one account as being at least one of a sender to or a recipient from another account based on a threshold number of communications; or mentor information;

wherein the one or more relationship attributes being included within active directory information associated with the first email domain, the first identity domain or the first file domain;

associating the accounts or objects to create a collection of related accounts, until a threshold number of accounts has been reached;

determine one or more circular relationships among the collection of related accounts;

resolve the one or more circular relationships; and migrating information included in the collection of related accounts into a second email domain, a second identity domain or a second file domain.

20. The method of claim 19, further comprising:

identifying one or more first-level objects that are identified as having a relationship with a predefined root account based on at least one of an access control, a delegation attribute, or another type of relationship criteria.

* * * * *